United States Patent
Adachi et al.

(10) Patent No.: US 7,953,009 B2
(45) Date of Patent: May 31, 2011

(54) VEHICLE COMMUNICATION METHOD AND COMMUNICATION DEVICE

(75) Inventors: Akito Adachi, Aichi-ken (JP); Hiroshi Tominaga, Toyota (JP); Nobuhiro Yokogawa, Toyota (JP); Toshiyuki Abe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 252 days.

(21) Appl. No.: 12/086,759

(22) PCT Filed: Dec. 18, 2006

(86) PCT No.: PCT/IB2006/003657
§ 371 (c)(1),
(2), (4) Date: Jun. 19, 2008

(87) PCT Pub. No.: WO2007/072160
PCT Pub. Date: Jun. 28, 2007

(65) Prior Publication Data
US 2009/0116388 A1    May 7, 2009

(30) Foreign Application Priority Data

Dec. 19, 2005 (JP) .................................. 2005-364844

(51) Int. Cl.
*H04B 7/204* (2006.01)
(52) U.S. Cl. .................. 370/235; 370/229; 455/522
(58) Field of Classification Search .......... 370/229–235; 455/522
See application file for complete search history.

(56) References Cited

U.S. PATENT DOCUMENTS

| 6,320,518 B2 * | 11/2001 | Saeki et al. ............. 340/995.12 |
| 6,470,025 B1 * | 10/2002 | Wilson et al. ................. 370/462 |
| 2005/0107107 A1 * | 5/2005 | Shahidi et al. ................ 455/522 |

FOREIGN PATENT DOCUMENTS

| DE | 101 57 680 | 6/2003 |
| JP | 9-54738 | 2/1997 |
| JP | 9-238153 | 9/1997 |
| JP | 10-51570 | 2/1998 |
| JP | 2000-259520 | 9/2000 |
| JP | 2002-124981 | 4/2002 |
| JP | 2003-220906 | 8/2003 |
| JP | 2004-232498 | 8/2004 |
| JP | 2005-22556 | 1/2005 |
| JP | 2005-43138 | 2/2005 |

(Continued)

OTHER PUBLICATIONS

Japanese Office Action dated Feb. 9, 2009.

(Continued)

*Primary Examiner* — Phuc Tran
(74) *Attorney, Agent, or Firm* — Finnegan, Henderson, Farabow, Garrett & Dunner, LLP

(57) ABSTRACT

In a vehicle communication method in which communication between a plurality of communication devices is performed and an amount of communication data sent from each communication device is changed, features are as follows. That is, if the amount of communication data sent from the first communication device is to be increased, the amount of communication data sent from the second communication device is decreased so that a total sum of the amounts of communication data sent from all the communication devices does not exceed a predetermined value.

14 Claims, 3 Drawing Sheets

FOREIGN PATENT DOCUMENTS

| JP | 2005-53309 | 3/2005 |
|---|---|---|
| JP | 2005-65164 | 3/2005 |
| JP | 2005-219717 | 8/2005 |

OTHER PUBLICATIONS

R. J. Punnoose, et al., "Communications Resources Management for Advanced Telematics Applications," *IEEE Intelligent Transportation Systems Conference Proceedings* (Aug. 25-29, 2001), Oakland, CA, pp. 1056-1060.

M. Rabel, et al., "Integrating IEEE 1394 as Infotainment Backbone into the Automotive Environment," *IEEE VTS 53$^{rd}$*, Vehicular Technology Conference, Rhodes, Greece, May 6-9, 2001, pp. 2026-2031.

R.H.J. Bloks, "The IEEE-1394 High Speed Serial Bus," *Philips J. Res.*, 50 (1996),, pp. 209-216.

R. Jennings, "Fire on the Wire: The IEEE 1394 High Performance Serial Bus," *Adaptic, Inc.*, (Jan. 15, 1997) XP 002087275.

Japanese Office Action dated Sep. 9, 2008.

\* cited by examiner

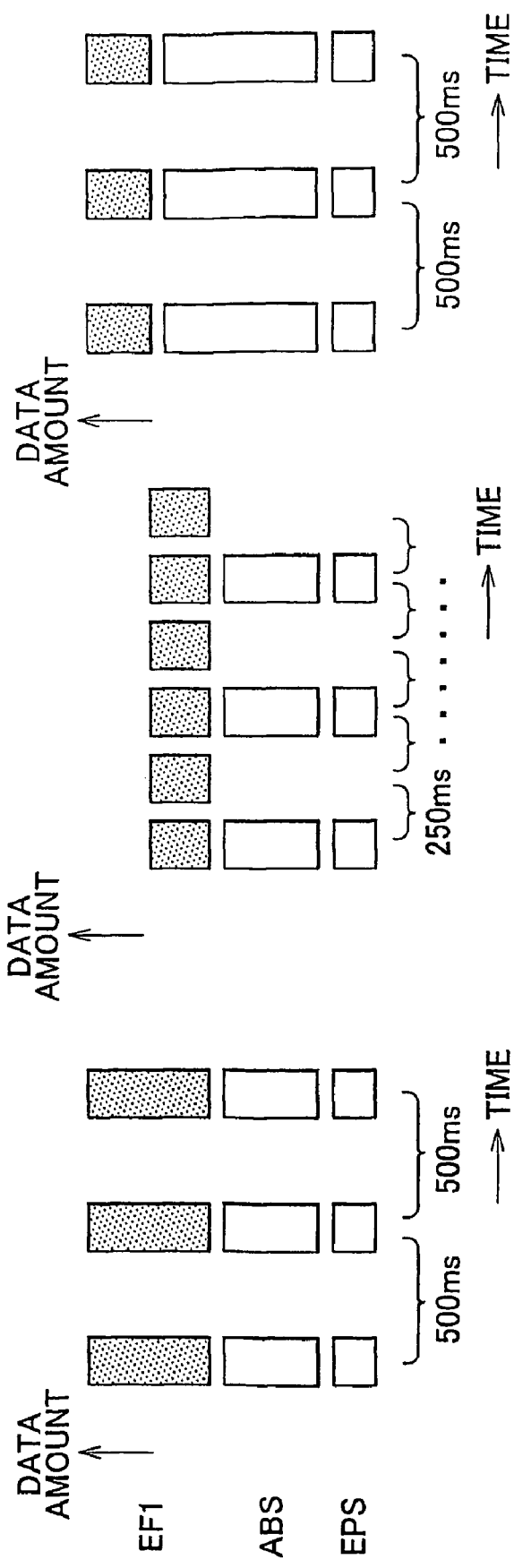

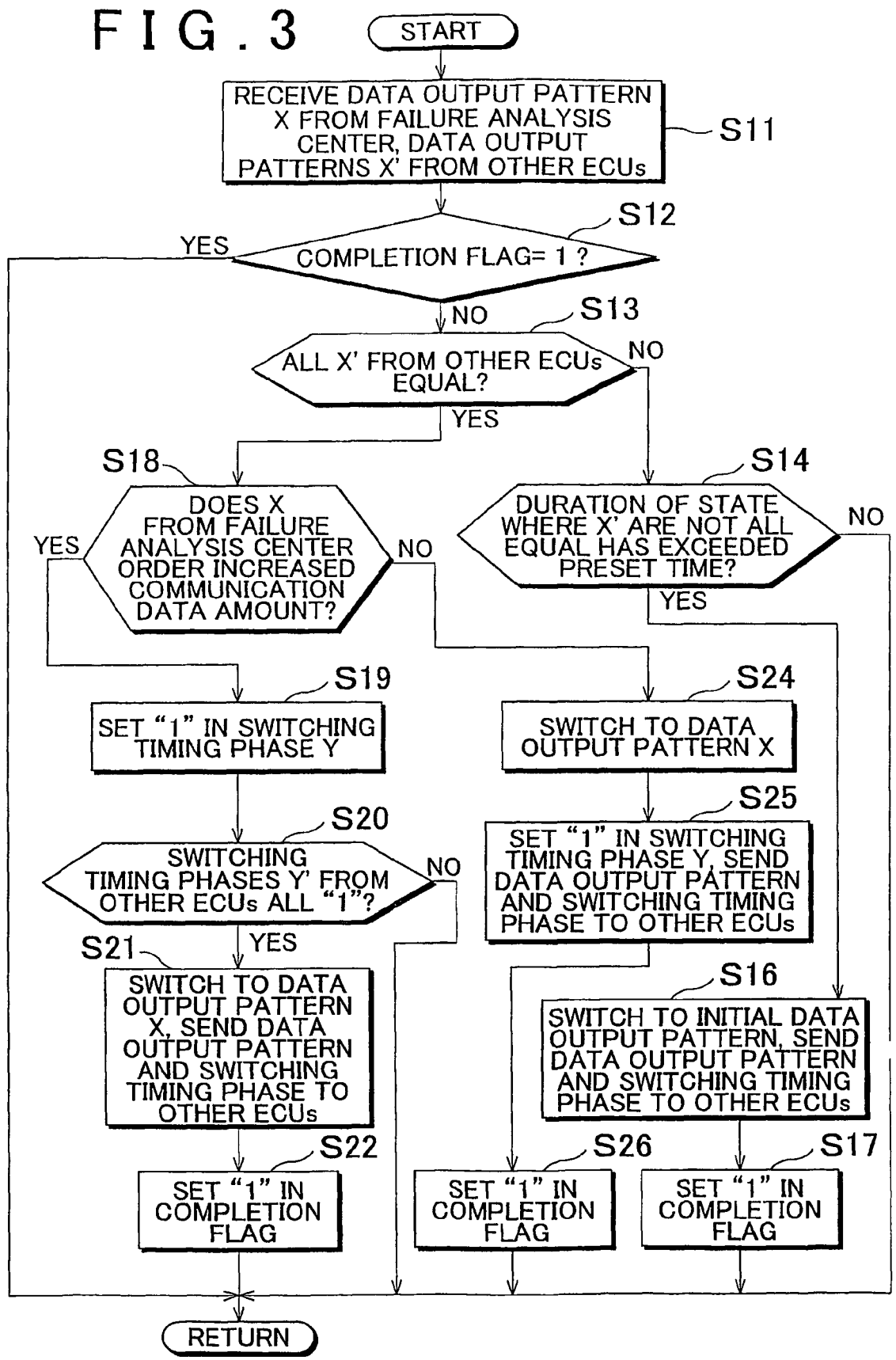

VEHICLE COMMUNICATION METHOD AND COMMUNICATION DEVICE

BACKGROUND OF THE INVENTION

1. Field of the Invention

The invention relates to a vehicle communication method and a communication device and, more particularly, to a vehicle communication method and a communication device in which data transmitted from a plurality of communication devices provided in various portions of a vehicle via communication lines is stored into a record medium and the amount of communication data sent from each communication device is changed.

2. Description of the Related Art

A remote diagnostic system has been developed in which vehicle information obtained by ECUs (electronic control devices) provided in various portions of a vehicle are sent to a storage device via a communication network called in-vehicle LAN (Local Area Network), and if a failure occurs in the vehicle, communication between a communication module in the vehicle and a failure analysis center is performed to send necessary vehicle information from the storage device to the failure analysis center, and the failure analysis center performs analysis of the vehicle's failure.

Japanese Patent Application Laid-Open Publication No. 2005-22556 describes sending and storing vehicle information from various ECUs to a record medium in the vehicle, and sending gathered information to an external server in accordance with need for diagnosis of abnormality of the vehicle.

Japanese Patent Application Laid-Open Publication No. 2004-232498 describes sending vehicle information to a storage medium in accordance with cycles predetermined for the individual ECUs.

In a remote diagnostic system in which each ECU sends vehicle information needed for diagnosis periodically to a storage device, it often happens that during the course of narrowing down potential causes of the failure, there occurs a desire to change the kind of vehicle information acquired from a specific ECU, or a desire to change the sampling cycle regarding the vehicle information acquired.

For example, if the number of kinds of vehicle information acquired from a specific ECU increases and the data amount increases, or if the data amount increases due to a change of the sampling cycle, there is a need to reduce the data amount of vehicle information acquired from the other ECUs so as to avoid congestion of the in-vehicle LAN.

However, if there is an error in the recognition of the amount of data sent by each ECU, or if the timing of decreasing the amount of data sent from the other ECUs is later than the timing at which the amount of data sent from a specific ECU increases, a problem arises, that is, congestion occurs in the in-vehicle LAN, so that information needed by the ECUs for the vehicle control cannot be obtained, and thus the vehicle control is considerably affected.

SUMMARY OF THE INVENTION

It is an object of an embodiment of the invention to provide a vehicle communication method and a communication device that are capable of preventing occurrence of congestion in an in-vehicle LAN and therefore preventing influence on the vehicle control if the communication data amount is changed.

The vehicle communication method of an embodiment of the invention is a method in which data transmitted from a plurality of communication devices provided in various portions of a vehicle via a communication line is stored into a record medium, and an amount of communication data sent from each communication device is changed. In the vehicle communication method, if the amount of communication data sent from one or more of the communication devices is to be increased, the amount of communication data sent from another one or more of the communication devices is decreased so that a total sum of the amounts of communication data sent from all the communication devices does not exceed a predetermined value. Therefore, if the communication data amount is changed, this method prevents occurrence of congestion in an in-vehicle LAN, and therefore prevents influence on the vehicle control.

In this vehicle communication method, increase of the amount of communication data sent from the first communication device may be performed following decrease of the amount of communication data sent from the second communication device.

In the vehicle communication method, the amount of communication data sent from each one of the plurality of communication devices may be determined beforehand so that the total sum of the amounts of communication data sent from all the communication devices does not exceed the predetermined value, in accordance with a plurality of data output patterns, and each communication device may be ordered a data output pattern by a higher-level device.

The communication device of an embodiment of the invention is a communication device of a vehicle communication system in which data transmitted from a plurality of communication devices that include a first communication device and a second communication device provided in various portions of a vehicle via a communication line is stored into a record medium, and an amount of communication data sent from each communication device is changed. In the communication device, the amount of communication data sent from each one of the plurality of communication devices is determined beforehand so that a total sum of the amounts, of communication data sent from all the communication devices does not exceed a predetermined value, in accordance with a plurality of data output patterns, and the communication device has data output pattern notification means for changing the amount of communication data sent, by switching the data output pattern of the first communication device to the data output pattern ordered by a higher-level device. Therefore, if the communication data amount is changed, the communication device prevents occurrence of congestion in an in-vehicle LAN, and therefore prevents influence on the vehicle control.

The communication device may further have reception means for receiving the data output pattern ordered by the higher-level device and the data output patterns notified of by the second communication devices, and equality detection means for detecting that the data output patterns notified of by the second communication devices are all equal when it is detected by the equality detection means that the data output patterns are all equal, the data output pattern notification means may change the amount of communication data sent from the first communication device.

The communication device may further have forced switching means for switching the data output pattern of the first communication device to an initial data output pattern, if after a data output pattern is ordered by the higher-level device, a duration of a state where the data output patterns are not all equal exceeds a predetermined time.

The communication device may further have switching-done detection means. In this communication device, the reception means receives via the second communication device a switching timing phase that indicates a state of switching to a data output pattern ordered by the higher-level device in the first communication device, and the switching-done detection means detects that the switching timing phase of the second communication device received by the reception means has come to indicate that the switching has been done if the amount of communication data sent from the first communication device increases due to the data output pattern ordered by the higher-level device. When the switching-done detection means detects that the switching timing phases of the second communication device all have come to indicate that the switching has been done, the data output pattern notification means may change the communication data amount.

The communication device may further have switching timing phase notification means for notifying the second communication device of a switching timing phase that indicates a state of switching to the data output pattern ordered by the higher-level device. In the communication device, if due to the data output pattern ordered by the higher-level device, the amount of communication data sent from the first communication device increases, the switching timing phase notification means may notify the second communication device of the switching timing phase as a switching timing phase that indicates that the switching has been done, before the data output pattern notification means increases the amount of communication data sent from the first communication device.

In the communication device, if due to the data output pattern ordered by the higher-level device, the amount of communication data sent from the first communication device decreases, the switching timing phase notification means may notify the second communication device of the switching timing phase as a switching timing phase that indicates that the switching has been done, after the data output pattern notification means decreases the amount of communication data sent from the first communication device.

According to the embodiment, if the communication data amount is changed, the occurrence of congestion in the in-vehicle LAN is prevented, and therefore influence on the vehicle control is prevented.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 2A to 2C are diagrams for describing data output patterns; and

FIG. 3 is a flowchart of an embodiment of a process executed by each of ECUs that constitute the vehicle communication system of the invention.

DETAILED DESCRIPTION OF THE PREFERRED EMBODIMENTS

Figure 1:
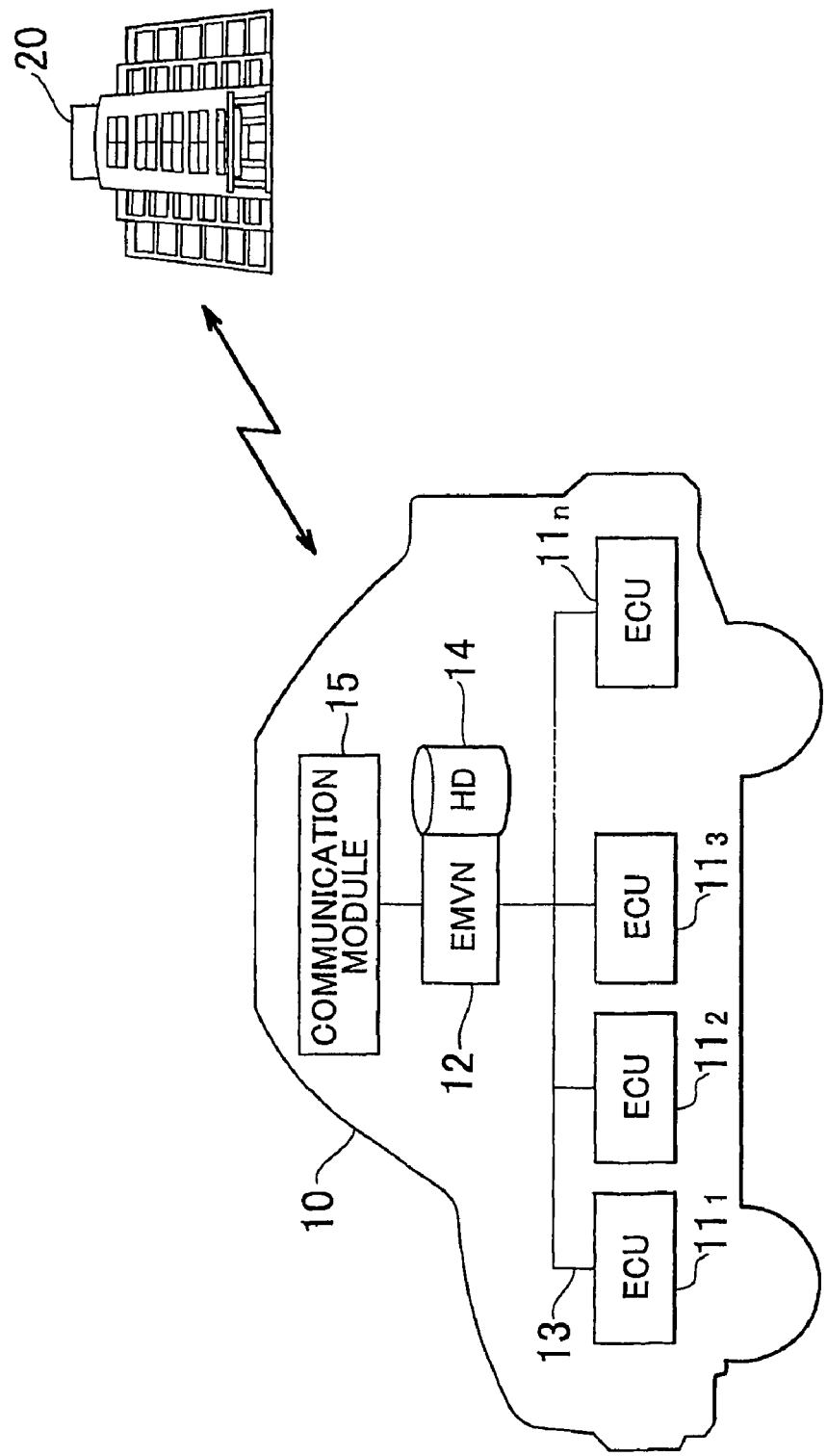
FIG. 1 is a construction diagram of an embodiment of a vehicle communication system of the invention.

Embodiments of the invention will be described hereinafter with reference to the drawings.
<Construction of Vehicle Communication System>
FIG. 1 is a construction diagram of an embodiment of a vehicle communication system of the invention. In a vehicle 10 in this diagram, ECUs (electronic control devices) $11_1$ to $11_n$ and an EMVN (navigation-purpose computer) 12 are connected to a CAN (Controller Area Network) bus 13 for mutual data exchange, thus making up an in-vehicle LAN. Incidentally, the ECUs $11_1$ to $11_n$ are provided for performing various controls, for example, an EFI (fuel injection control), an ABS (brake control), an EPS (steering control), a suspension control, etc.

A storage device (e.g., a hard disk) 14 is provided together with the EMVN 12, and a communication module 15 is connected thereto. The EMVN 12 is connected, via the communication module 15, to a failure analysis center 20 by a wireless line.

<Data Output Pattern>
In this embodiment, data output patterns in which the ECUs $11_1$ to $11_n$ output data to the CAN bus 13 are pre-set so that a communication data amount of the CAN bus 13 permitted for remote diagnosis will not be exceeded. This is a contrive for omitting the provision of a master ECU. If the data amounts and the sampling cycles of the ECUs $11_1$ to $11_n$ are changed independently without taking synchronization with one another, it becomes necessary to provide a master ECU for checking whether or not the communication data amount of the CAN 13 permitted for remote diagnosis will be exceeded.

In a data output pattern A shown in FIG. 2A, the output data amount of the EFI ECU (e.g., $11_1$) is set to be relatively large, and the output data amount of the ABS ECU (e.g., $11_2$) is set to be moderate, and the output data amount of the EPS ECU (e.g., $11_3$) is set to be small, and the sampling cycles of the ECUs are fixed at 500 msec. This data output pattern A is set as an initial pattern.

In a data output pattern B shown in FIG. 2B, the output data amount of the EFI ECU is a half of the amount thereof in the pattern of FIG. 2A, and the sampling cycle thereof is 250 msec, which is a half of that in FIG. 2A (i.e., a double in the sampling frequency). Furthermore, the output data amount and the sampling cycle of the ABS ECU are the same as those in FIG. 2A, and the output data amount and the sampling cycle of the EPS ECU are the same as in FIG. 2A. It is to be noted herein that in the change from the data output pattern A to the data output pattern B, the communication data amount per unit time (e.g., 500 msec) of each ECU does not change.

In a data output pattern C shown in FIG. 2C, the output data amount of the EFI ECU is a half of that in FIG. 2A, and the sampling cycle thereof is the same as in FIG. 2A. Furthermore, the output data amount of the ABS ECU is a double of that shown FIG. 2A, and the sampling cycle thereof is the same as in FIG. 2A, and the output data amount and the sampling cycle of the EPS ECU are the same as in FIG. 2A. It is to be noted herein that in the change from the data output pattern A to the data output pattern C, the communication data amount per unit time of the EFI ECU decreases to a half while the communication data amount per unit time of the ABS ECU increases to a double.

<Data Output Pattern And Switch Timing Phase>
In this embodiment, each ECU $11_1$ to $11_n$ informs the other ECUs of the data output pattern X and the switching timing phase Y that are set in the ECU itself. The data output pattern X set in the ECU itself includes the data output patterns A, B, C, etc.

The switching timing phase Y is provided so that an ECU that has been ordered an increased communication data amount due to an increase in the output data amount or a decrease in the sampling frequency is not permitted to switch the data output pattern until an ECU that has been ordered a decreased communication data amount due to a decrease in the output data amount or an increase in the sampling frequency switches data output patterns. A value "0" of the switching timing phase Y is a flag indicating "not done", and a value "1" thereof is a flag indicating "done". The switching timing phase Y=0 indicates a state where the order sent from the failure analysis center 20 via the EMVN 12 is an order to decrease the communication data amount and the switching is not done. The switching timing phase Y=1 indicates a state where the sent order is an order to increase the communication data amount and the switching is done, or a state where the sent order is an order to decrease the communication data amount and the switching is done.

<Flowchart of Switching Data Output Pattern>

FIG. 3 shows a flowchart of an embodiment of a process executed by each of the ECUs that constitute the above-described vehicle communication system. This process is executed at every predetermined time of about several milliseconds to about several ten milliseconds.

In FIG. 3, each ECU, at step S11, receives a data output pattern X sent from the failure analysis center 20 to a broadcast portion of the EMVN 12, and receives data output patterns X' notified of by other ECUs. Each ECU, at step S12, discriminates whether or not a completion flag is the value "1". If the completion flag is the value "1", the ECU ends this process. The completion flag is reset to the value "0" if the data output pattern X received from the failure analysis center 20 has changed from the value of the previously received data output pattern X.

If the completion flag is the value "0", the execution process proceeds to step S13, at which the ECU discriminates whether or not the values of the data output pattern X' notified of by the other ECUs are all equal. If the values of the data output pattern X' notified of by the other ECUs are not all equal, the execution process proceeds to step S14. At step S14, each ECU discriminates whether or not, after reception of a data output pattern X from the failure analysis center 20, the time during which the values of the data output pattern X' of the other ECUs are not all equal has exceeded a predetermined time T (T is, e.g., several 10 to several 100 msec). If the time during which the values of the data output pattern X' of the other ECUs are not all equal has not exceeded the predetermined time T, each ECU ends this process.

If the time during which the values of the data output pattern X' of the other ECUs are not all equal has exceeded the predetermined time T, the execution process proceeds to step S16. At step S16, each ECU sets, in a forced fashion, the data output pattern of the ECU itself to the data output pattern A (the pattern shown in FIG. 2A), and sends this data output pattern and the switching timing phase to the other ECUs. Subsequently at step S17, each ECU sets the value "1" in the completion flag. After that, each ECU ends this process.

On the other hand, if at step S13 the values of the data output pattern X' notified of by the other ECUs are all equal, the execution process proceeds to step S18. At step S18, each ECU discriminates whether or not the data output pattern X from the failure analysis center 20 orders an increased communication data amount due to an increase in the output data amount or a decrease in the sampling frequency.

If the data output pattern X from the failure analysis center 20 orders an increased communication data amount due to an increase in the output data amount or a decrease in the sampling frequency, each ECU, at step S19, sets in the switching timing phase Y the value "1", which indicates "done". Subsequently, the execution process proceeds to step S20.

At step S20, each ECU discriminates whether or not the values of the switching timing phase Y' notified of by the other ECUs are all "1". If the values of the switching timing phase Y' notified of by the other ECUs are all "1", each ECU, at step S21, switches the data output pattern of the ECU itself to the data output pattern X received from the failure analysis center 20, and sends this data output pattern and the switching timing phase to the other ECUs, and sets the value "1" in the completion flag at step S22, and then ends this process.

On the other hand, if at step S18, the data output pattern X from the failure analysis center 20 does not order an increased communication data amount due to an increase in the output data amount or a decrease in the sampling frequency, that is, if the data output pattern X orders a decreased communication data amount due to a decrease in the output data amount or an increase in the sampling frequency, the process proceeds to step S24. At step S24, the data output pattern of the ECU itself is switched to the data output pattern X received from the failure analysis center 20. Next, at step S25, each ECU sets in the switching timing phase Y the value "1", which indicates "done", and sends the data output pattern and the switching timing phase to the other ECUs. At step S26, each ECU sets the value "1" in the completion flag. After that, each ECU ends this process.

Thus, if the amount of communication data sent from one or more of the ECUs is to be increased, the amount of communication data sent from another one or more of the ECUs is decreased and, after that, the amount of communication data sent from the aforementioned one or more of the ECUs is increased, so that the total sum of the amounts of communication data sent from all the ECUs does not exceed a predetermined value. Therefore, if the communication data amount is changed, the occurrence of congestion in the in-vehicle LAN is prevented, and therefore influence on the vehicle control is prevented.

Furthermore, the amount of communication data sent from each one of the ECUs is predetermined in accordance with a plurality of data output patterns so that the total sum of the amounts of communication data sent from all the ECUs does not exceed a predetermined value. Besides, each ECU is ordered a data output pattern by the failure analysis center. Therefore, the amount of communication data sent by each ECU can be changed independently without taking synchronization with the other ECUs.

Each ECU, after receiving the data output pattern ordered by the failure analysis center, notifies the other ECUs of the data output pattern received, and performs the switching of data output patterns after detecting that the data output patterns notified of by the other ECUs are all equal. Thus, it becomes possible to switch the data output patterns of all the ECUs without provision of a master ECU.

If after a data output pattern is ordered by the failure analysis center, the duration of the state where the data output patterns notified of by the other ECUs are not all equal exceeds a predetermined time, then the data output pattern of the ECU itself is switched, in a forced fashion, to the initial data output pattern. Thus, if a trouble occurs in the in-vehicle LAN, the data output pattern of the ECU can be changed to the initial data output pattern.

If the amount of communication data sent by the ECU itself is to increase due to a data output pattern ordered by the failure analysis center, the ECU performs the switching of data output patterns after detecting that the switching timing phases notified of by the other ECUs all have come to indicate that the switching has been done. Thus, the amount of communication data sent by each ECU can be changed independently without taking synchronization with the other ECUs.

If the amount of communication data sent by the ECU itself is to increase due to a data output pattern ordered by the failure analysis center, the ECU, prior to switching to the data output pattern, notifies the other ECU of the switching timing phase as a switching timing phase that indicates that the switching has been done. Thus, even if the amount of communication data sent by ECUs is to increase due to data output patterns ordered by the failure analysis center, each one of these ECUs can switch the data output pattern after confirming that the switching timing phases notified of by the other ECUs all indicate that the switching has been done.

Incidentally, the ECUs $11_1$ to $11_n$ are examples of communication devices mentioned in the appended claims, and the failure analysis center 20 is an example of a higher-level device. Furthermore, steps S21 and S24 are examples of data output pattern notification means, step S13 is an example of equality detection means, step S16 is an example of forced switching means, steps S16, S21 and S25 are examples of switching timing phase notification means, and step S20 is an example of switching-done detection means.

The invention claimed is:

1. A vehicle communication method in which communication between a plurality of communication devices is performed, wherein the plurality of communication devices include a first communication device and a second communication device, comprising:
   determining beforehand the total sum of the amounts of communication data per unit time sent from all the communication devices that does not exceed a predetermined value of communication data,
   executing a process by each of the communication devices at predetermined time intervals, in which if an amount of communication data per unit time sent from the first communication device is increased, an amount of communication data per unit time sent from the second communication device is decreased so that a total sum of the amounts of communication data per unit time sent from all the communication devices does not exceed a predetermined value,
   receiving, via a reception device, data output patterns ordered by a higher-level device, the data output patterns being notified by the second communication device, and
   detecting, via an equality detection device, whether the data output patterns notified by the second communication device are substantially equal, wherein when the equality detection device detects that the data output patterns are substantially equal, a data output pattern switching device changes the amount of communication data.

2. The vehicle communication method according to claim 1, wherein the amount of communication data sent from the first communication device increases after the amount of communication data sent from the second communication device decreases.

3. The vehicle communication method according to claim 2, further comprising:
   determining beforehand the amount of communication data sent from each one of the plurality of communication devices in accordance with the data output patterns so that the total sum of the amounts of communication data sent from all the communication devices does not exceed the predetermined value of communication data, and
   ordering each communication device for the data output patterns.

4. A vehicle communication system in which communication between a plurality of communication devices is performed, comprising:
   a first communication device and second communication devices, and
   a higher level device, wherein:
   the first communication device comprises:
      a reception device that receives data output patterns ordered by the higher-level device, the data output patterns being notified by the second communication devices, and
      an equality detection device that detects that data output patterns notified by the second communication devices are substantially equal,
   the total sum of the amounts of communication data per unit time sent from all the communication devices does not exceed a predetermined value of communication data,
   the first communication device comprises a data output pattern switching device that changes the amount of communication data sent, by switching a data output pattern of the first communication device to the data output patterns ordered by the higher-level device,
   the amount of communication data sent from the respective communication device is determined beforehand in accordance with the data output patterns at predetermined time intervals so that a total sum of the amounts of communication data sent from all the communication devices of the vehicle communication system does not exceed the predetermined value of communication data, and
   when it is detected by the equality detection device that the data output patterns are substantially equal, the data output pattern switching device changes the amount of communication data.

5. The vehicle communication system according to claim 4, wherein the first communication device further comprises a forced switching device that switches the data output patterns of the first communication device to an initial data output pattern, if after the data output pattern is received from the higher-level device, a duration of a state where it is not detected by the equality detection device that the data output patterns are substantially equal exceeds a predetermined time.

6. The vehicle communication system according to claim 5, wherein the first communication device further comprises a switching-done detection device, wherein
   the reception device receives via the second communication devices switching timing phases that indicate a state of switching to a data output pattern ordered by the higher-level device in the first communication device,
   the switching-done detection device detects that the switching timing phases of the second communication devices received by the reception device have indicated that the switching has been done if the amount of communication data sent from the first communication device increases due to the data output pattern ordered by the higher-level device, and
   when the switching-done detection device detects that the switching timing phases of the second communication devices all have indicated that the switching has been done, the data output pattern switching device changes the communication data amount sent from the first communication device.

7. The vehicle communication system according to claim 6, wherein the first communication device further comprises a switching timing phase notification device that notifies the second communication devices of a switching timing phase that indicates a state of switching to the data output pattern ordered by the higher-level device,
   wherein if the amount of communication data sent from the first communication device due to the data output pattern ordered by the higher-level device increases, the switching timing phase notification device notifies the second communication devices of the switching timing phase of the first communication device that indicates that the switching has been done before the data output pattern switching device increases the amount of communication data sent from the first communication device.

8. The vehicle communication system according to claim 6, wherein the first communication device further comprises a switching timing phase notification device that notifies the second communication devices of a switching timing phase that indicates a state of switching to the data output pattern ordered by the higher-level device,
wherein if the amount of communication data sent from the first communication device due to the data output pattern ordered by the higher-level device decreases, the switching timing phase notification device notifies the second communication devices of the switching timing phase that indicates that the switching has been done after the data output pattern switching device decreases the amount of communication data sent from the first communication device.

9. The vehicle communication system according to claim 4, further comprising:
a switching-done detection device, wherein
the reception device receives via the second communication devices switching timing phases that indicate a state of switching to the data output pattern ordered by the higher-level device in the communication device,
the switching-done detection device detects that the switching timing phases of the second communication devices received by the reception device have indicated that the switching has been done if the amount of communication data sent from the said communication device increases due to the data output pattern ordered by the higher-level device, and
when the switching-done detection device detects that the switching timing phase of the second communication devices all have indicated that the switching has been done, the data output pattern switching device changes the communication data amount sent from the communication device.

10. The vehicle communication system, according to claim 9, further comprising:
a switching timing phase notification device that notifies the second communication devices of a switching timing phase that indicates a state of switching to the data output pattern ordered by the higher-level device,
wherein if the amount of communication data sent from the communication device due to the data output pattern ordered by the higher-level device increases, the switching timing phase notification device notifies the second communication devices of the switching timing phase of the communication device that indicates that the switching has been done before the data output pattern switching device increases the amount of communication data sent from the communication device.

11. The vehicle communication system according to claim 9, further comprising:
a switching timing phase notification device that notifies the second communication devices of a switching timing phase that indicates a state of switching to the data output pattern ordered by the higher-level device,
wherein if the amount of communication data sent from the communication device due to the data output pattern ordered by the higher-level device decreases, the switching timing phase notification device notifies the second communication devices of the switching timing phase that indicates that the switching has been done after the data output pattern switching device decreases the amount of communication data sent from the communication device.

12. A vehicle communication system comprising:
a data output pattern switching device that changes an amount of communication data to be sent, by switching the data output pattern of said device to the data output pattern ordered by a higher-level device,
a first communication device and second communication devices, and
a higher level device,
wherein:
the first communication device comprises:
a reception device that receives data output patterns ordered by the higher-level device, the data output patterns being notified by the second communication devices, and
an equality detection device that detects that data output patterns notified by the second communication devices are substantially equal,
the total sum of the amounts of communication data per unit time sent from all the communication devices does not exceed a predetermined value of communication data,
the first communication device comprises a data output pattern switching device that changes the amount of communication data sent, by switching a data output pattern of the first communication device to the data output patterns ordered by the higher-level device,
the amount of communication data sent from the respective communication device is determined beforehand in accordance with the data output patterns at predetermined time intervals so that a total sum of the amounts of communication data sent from all the communication devices of the vehicle communication system does not exceed the predetermined value of communication data,
when it is detected by the equality detection device that the data output patterns are substantially equal, the data output pattern switching device changes the amount of communication data, and
the amount of communication data to be sent from the communication device is determined beforehand in accordance with the data output pattern at predetermined time intervals so that a total sum of the amounts of communication data sent from all the communication devices of the vehicle communication system does not exceed a predetermined value of communication data.

13. The vehicle communication system according to claim 12, wherein the data output pattern switching device informs the second communication devices of the changed data output pattern.

14. The vehicle communication system according to claim 13, further comprising:
a forced switching device that switches the data output pattern of the communication device to an initial data output pattern, if after the data output pattern is received from the higher-level device, a duration of a state where it is not detected by the equality detection device that the data output patterns are substantially equal exceeds a predetermined time.

* * * * *